United States Patent
Vanbuskirk et al.

(10) Patent No.: US 6,308,157 B1
(45) Date of Patent: Oct. 23, 2001

(54) METHOD AND APPARATUS FOR PROVIDING AN EVENT-BASED "WHAT-CAN-I-SAY?" WINDOW

(75) Inventors: Ronald E. Vanbuskirk, Indiantown; James R. Lewis, Delray Beach, both of FL (US); Kerry A. Ortega, Raleigh, NC (US); Huifang Wang; Amado Nassiff, both of Boynton Beach, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/328,095

(22) Filed: Jun. 8, 1999

(51) Int. Cl.[7] .................................................. G10L 15/14
(52) U.S. Cl. .......................... 704/275; 704/270; 704/276; 704/240
(58) Field of Search ..................................... 704/275, 270, 704/251, 231, 276, 258, 240, 256

(56) References Cited

U.S. PATENT DOCUMENTS

| | | | |
|---|---|---|---|
| 5,664,061 | * | 9/1997 | Andreshak et al. ................. 704/275 |
| 5,832,439 | * | 11/1998 | Cox, Jr. et al. ...................... 704/275 |
| 5,842,161 | * | 11/1998 | Cohrs et al. .......................... 704/251 |
| 5,855,002 | * | 12/1998 | Armstrong ............................ 704/270 |
| 5,890,122 | * | 3/1999 | Van Kieeck et al. ................. 704/275 |
| 6,075,534 | * | 6/2000 | VanBuskirk et al. ................ 345/348 |
| 6,076,061 | * | 6/2000 | Kawasaki et al. .................... 704/270 |
| 6,085,159 | * | 7/2000 | Ortega et al. ........................ 704/235 |
| 6,101,472 | * | 8/2000 | Giangarra et al. ................... 704/275 |
| 6,182,046 | * | 1/2001 | Ortega et al. ........................ 704/275 |

OTHER PUBLICATIONS

IBM Technical Disclosure Bulletin, Integrated AudioGraphics User Interface, vol. 33, No. 11, pp. 368–371, Apr. 1991.*

* cited by examiner

Primary Examiner—William Korzuch
Assistant Examiner—Abul K. Azad

(57) ABSTRACT

A method and system efficiently identifies voice commands for a user of a speech recognition system. The method involves a series of steps including: receiving input from a user; monitoring the computer system to log system events and ascertain a current system state; predicting a probable next event according to the current system state and logged events; and identifying acceptable voice commands to perform the next event. The system events include commands, system control activities, timed activities, and application activation. These events are statistically analyzed in light of the current system state to determine the probable next event. The voice commands for performing the probable next event are displayed to the user.

13 Claims, 4 Drawing Sheets

METHOD AND APPARATUS FOR PROVIDING AN EVENT-BASED "WHAT-CAN-I-SAY?" WINDOW

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to an efficient method and system for informing a system user of available voice commands.

2. Description of the Related Art

Speech recognition is the process by which an acoustic signal received by microphone is converted to a set of text words by a computer. These recognized words may then be used in a variety of computer software applications for purposes such as document preparation, data entry and command and control. Speech recognition is generally a difficult problem due to the wide variety of pronunciations, accents and other speech characteristics of individual speakers.

One of the difficult aspects of speech recognition systems relates to a user's ability to control and navigate through speech-enabled applications using various commands. In the simplest possible command and control grammar, each function that the system can perform has no more than one speech phrase associated with it. At the other extreme is a command and control system based on natural language understanding (NLU). In an NLU system, the user can express commands using natural language, thereby providing total linguistic flexibility in command expression. Current command and control systems are beyond the simple one function—one speech phrase grammar, but are not yet at NLU.

Much like the Disk Operating System (DOS), speech recognition systems that approach but do not achieve the flexibility of NLU recognize only a finite set of voice commands. These systems have little utility for users who do not know the commands available for performing desired functions. Thus, initially, users must be made aware of possible commands simply to perform any voice activated functions at all. On the other hand, more advanced users may wish to know whether a particular speech command will be recognized. Or, a user who knows one way of issuing a speech command might want to know other speech commands that achieve the same system function or operation. Thereby, the user may ascertain a more efficient speech command or one having a better recognition accuracy for that user than the speech command that he or she has been using.

Conventional speech recognition systems offer various means to present the user with a list of all valid speech commands, typically filtered in some way to facilitate a search for a particular command. This approach works reasonably well given fairly simple command and control grammars. However, as command and control grammars begin to approach NLU, the number of available ways to state commands increases to the point of making such approaches cumbersome. The problem is exacerbated when the speech recognition system is deployed in embedded systems, which have minimal display and memory capacities.

Some systems display a list of all possible commands based on the current state of the system. In these systems, the content and quantity of commands displayed at a first state is typically different from that displayed at a second state. If there are fewer possible commands at the second state, the number of possible commands displayed will be decreased, however, if there are more possible commands the displayed list will be lengthened. It is also possible that the same commands may be displayed at different states if the possible commands have not changed from the prior state(s). Thus, these systems do not necessarily reduce the quantity of commands displayed to the user.

Accordingly, there is a need to provide a more effective system and methods for informing a system user of voice commands.

SUMMARY OF THE INVENTION

The present invention provides a method and system for efficiently and intelligently selecting probable commands according to system events, and thereby, reducing the number of commands displayed to the user.

Specifically, the present invention operates on a computer system that is adapted for speech recognition so as to identify voice commands for controlling a speech-enabled application running on the system. The method and system is performed by receiving input from a user and monitoring the system so as to log system events and ascertain a current system state. The current system state and logged events are analyzed to predict a probable next event. Acceptable voice commands, which can perform the next event, are then identified. The user is notified of the acceptable voice commands, preferably, in a displayed dialog window.

The present invention thus provides the object and advantage of intelligently selecting only commands that the user is likely to execute next. Because they are based on a predicted next event, the quantity of selected commands will be much less than that in conventional speech recognition systems. And, the short list of commands, listed in order of the most likely commands, can be easily displayed and viewed by the user. Thus, the present invention provides the further object and advantage of being operable in embedded systems, which have limited system resources.

The events used to predict the next events can include commands, system control activities, timed activities, and application activation. Thus, multiple event-based parameters are analyzed during the predicting process. The present invention, therefore, provides an additional object and advantage in that it can accurately determine the commands of interest to the user. The prediction accuracy of the present invention is enhanced by statistically modeling the prior events in light of the current system state. Additionally, because prior events can be used to modify the statistical model, the speech recognition system can be accurately tailored to the voice characteristics and command choices of a given speaker or set of speakers using the system.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
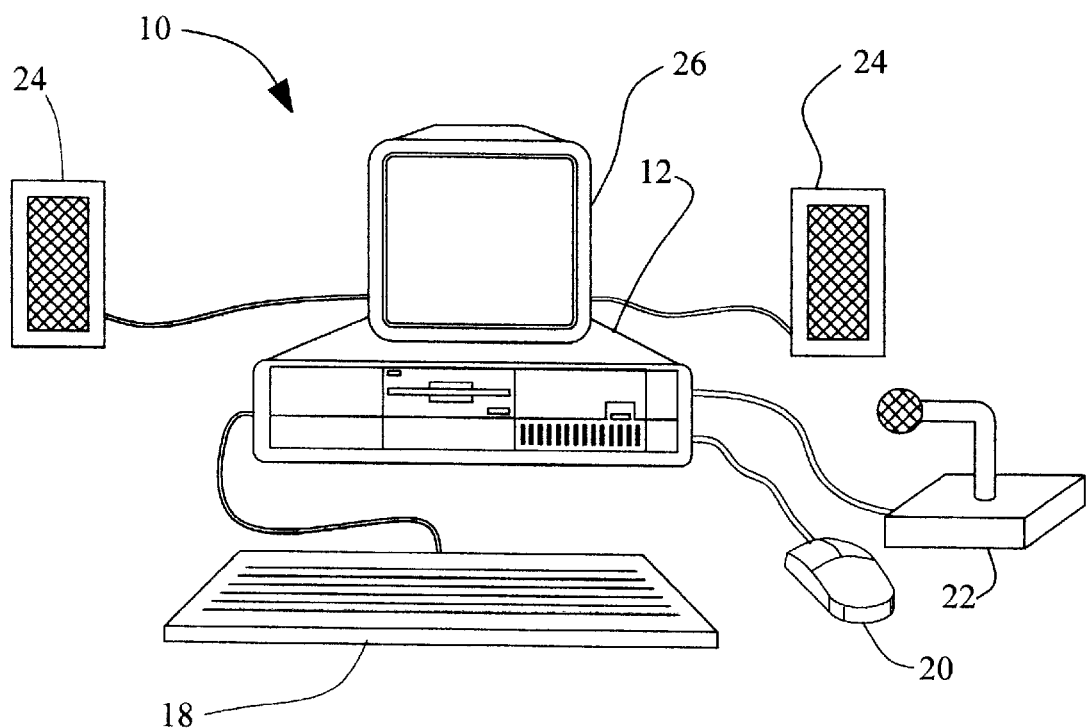
FIG. 1 shows a computer system for speech recognition with which the method and system of the present invention may be used.

Referring to the drawings in detail, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 14 (FIG. 2), at least one memory device 16 and related electronic circuitry (not shown). The computer system 10 also includes user input devices, a keyboard 18 and a pointing device 20, a microphone 22, audio loud speakers 24, and a video display 26, all of which are operatively connected to the computer 10 via suitable interface circuitry. The keyboard 18, pointing device 20 and loud speakers 24 may be a part of the computer system 10, but are not required for the operation of the invention, and the video display 26 may have a touch sensitive screen for user input.

Generally, the computer system 10, as described above, can be satisfied by any one of many high speed multi-media personal computers commercially available from manufacturers such as International Business Machines Corporation, Compaq, Hewlett Packard, or Apple Computers. The memory devices 16 preferably include an electronic random access memory module and a bulk storage device, such as a magnetic disk drive. The central processing unit 14 may be any suitable processing chip, such as any of the Pentium family microprocessing chips commercially available from Intel Corporation.

Figure 2:
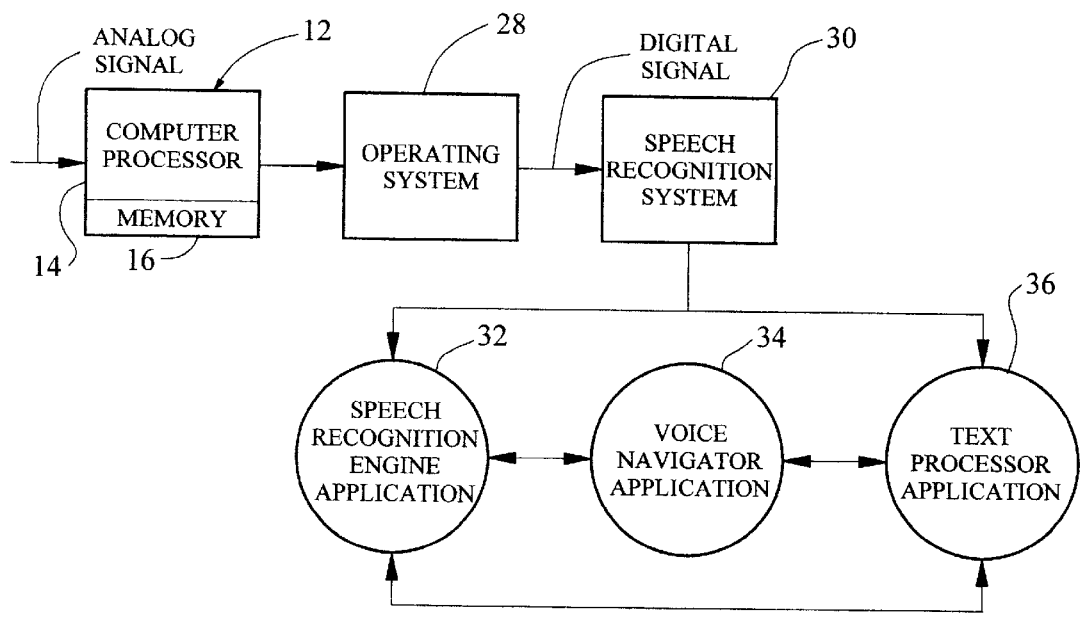
FIG. 2 is a block diagram showing a typical architecture for the computer system of FIG. 1 having a speech recognition engine.

Referring to FIG. 2, which illustrates a typical architecture for a computer system 10 having a speech recognition system, the system includes an operating system 28 and a speech recognition system 30. The speech recognition system 30 includes a speech recognition engine application 32 and a voice navigation application 34. A speech text processor application 36 may also be included. However, the invention is not limited in this regard and the speech recognition engine application 32 can be used with any other application program which is to be voice enabled.

In FIG. 2, the speech recognition engine 32, voice navigator 34 and text processor 36 are shown as separate application programs. It should be noted, however, that these applications could be implemented as a single, more complex application. Also, the system 30 may be modified to operate without the text processor application 36, if the speech recognition system 30 is to be used solely for command and control.

In a preferred embodiment, the operating system 28 is one of the Windows family of operating systems, such as Windows NT, Windows '95, Windows '98, or Windows CE, which are available from Microsoft Corporation of Redmond, Wash. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital convertor, which produces a digitized form of the signal. The operating system 28 transfers the digital command signal to the speech recognition system 30, where the command is recognized by the speech recognition engine 32 (as described below). The recognized command is then sent as a text phrase to an application, such as the voice navigator application 34, to perform the control function.

Figure 3:
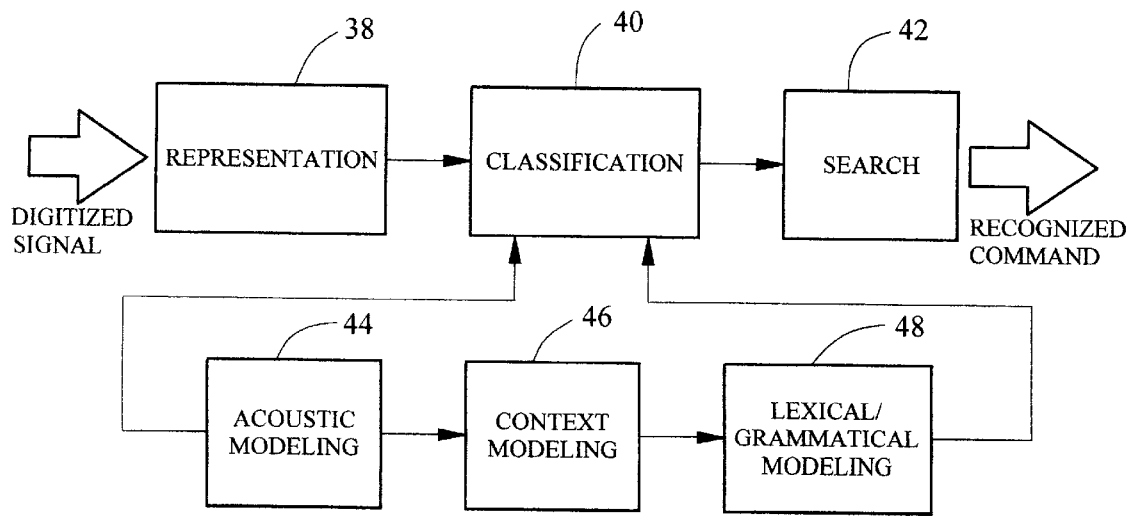
FIG. 3 is a block diagram showing the architecture for a speech recognition engine using contextual constraints in the recognition process.

Referring now to FIG. 3, the speech recognition engine 32 receives a digitized speech signal from the operating system 28. The signal is subsequently transformed in representation block 38 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In classification block 40, the processed speech command signal is used to identify, from the entire set of control commands, a subset of probable commands corresponding to the digitized speech command. This subset of probable commands is searched at block 42 to obtain the recognized command. Once the command is recognized, it is used to execute the corresponding system or application function.

Referring still to FIG. 3, classification block 40 is preferably performed by acoustic modeling block 44, context modeling block 46 and statistical analysis block 48. However, the present invention is not limited in this regard and can be performed with additional modeling techniques, such as language modeling, or with only one of the modeling means. At acoustic modeling block 44, known algorithms process the speech command signal to adapt speaker-independent acoustic models, contained in memory 16, to the acoustic signal of the current speaker and identify one or more probable matching commands. At block 46, additional algorithms process the command signal according to the current state of the computer system as well as context events occurring prior to or contemporaneously with the spoken command. These events can be the same events as utilized by the present invention in providing the user with a list of voice commands, as described below. At block 48, the system states and events are preferably statistically analyzed, using known statistical modeling techniques, to identify one or more probable commands matching the context in which the command was given. Block 46 may be executed independent of the acoustic modeling 44 or performed following the acoustic modeling to further constrain the probable acoustic matches.

Figure 4:
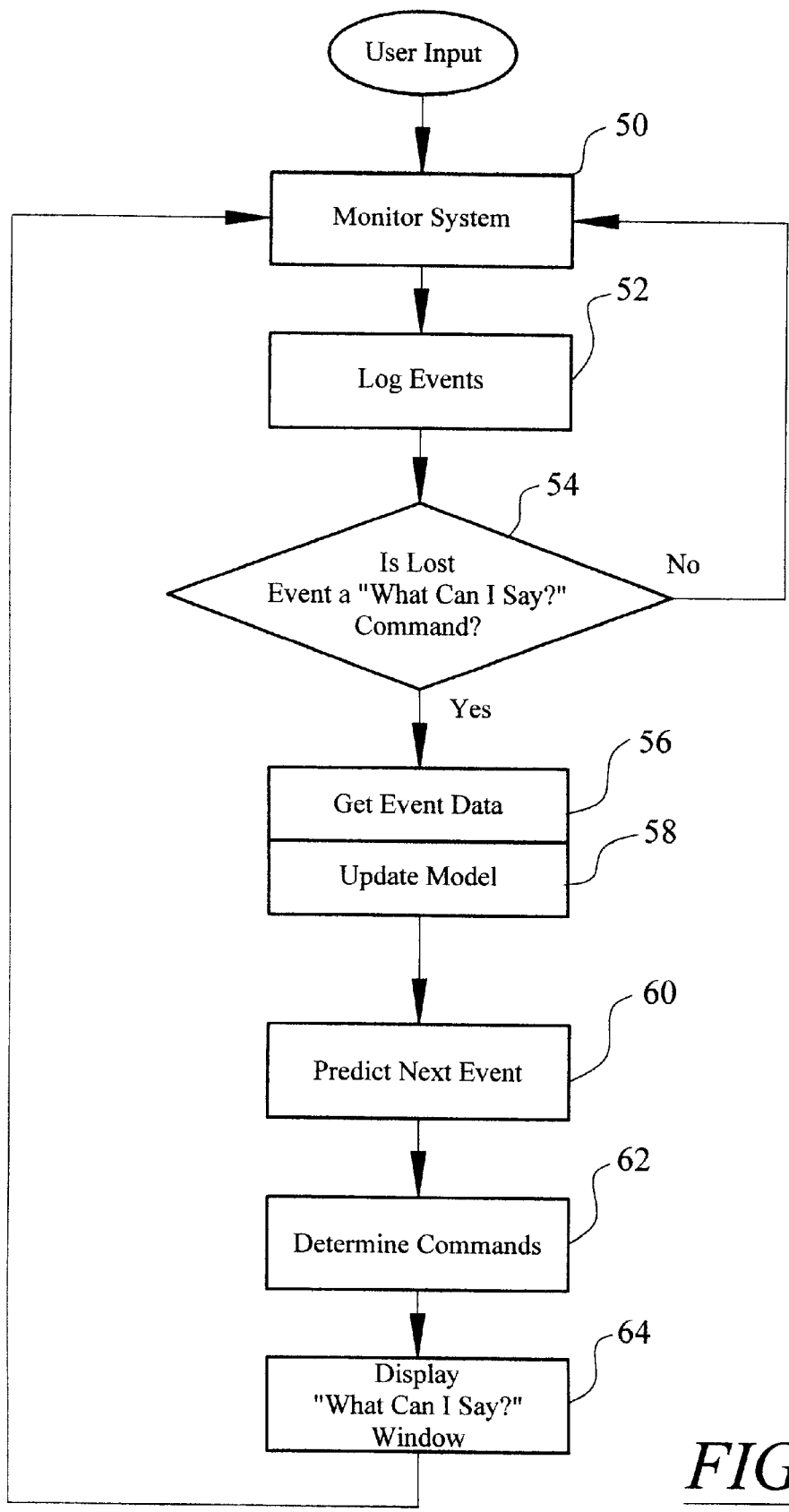
FIG. 4 is a flow chart showing a process for providing an event-based What-Can-I-Say? window according to the present invention.

Referring now to FIG. 4, the speech recognition engine 32 monitors user inputs in step 50. These user inputs can include navigator-commands, commands or dictation inputs directed to an associated speech enabled application program, and commands directed to the speech recognition engine application 32. The user inputs are preferably speech commands, but can also be in the form of control signals received via the operating system 28 from another input device such as a keyboard 18 or a mouse 20. If the input is a speech command, it is recognized as described above.

Also at step 50, the computer system 10 is monitored to discern the current state of the system as well as system or application events executed prior to or contemporaneously with the spoken command. In particular, the speech recognition engine 32 acquires data pertaining to prior commands, system control activities, timed activities, and application activation. Specifically, these data structures include activities such as: user inputs by voice, mouse, stylus or keyboard; operation of drop-down menus or buttons; the activation of applications or applets within an application; prior commands; and idle events, i.e., when no activity is logged in an event queue for a prescribed time period. At step 52, the event data is then logged in the random access memory or in a history file stored in the bulk storage device to be called up when the user inquires about what voice commands may be given.

In step 54, the system 30 determines whether it has received a user input inquiring as to what commands may be used. The command for this purpose is shown as "What Can I Say?" ("WCIS"). However, the invention is not limited in this regard and it will be understood by those skilled in the art that any other appropriate command utterance can be used for this purpose. Similarly, the WCIS command can also be made available to the user by an on-screen icon or menu command which has the same effect as the speech command. The WCIS command can be made available to all speech aware applications on the computer system 10.

Figure 5:
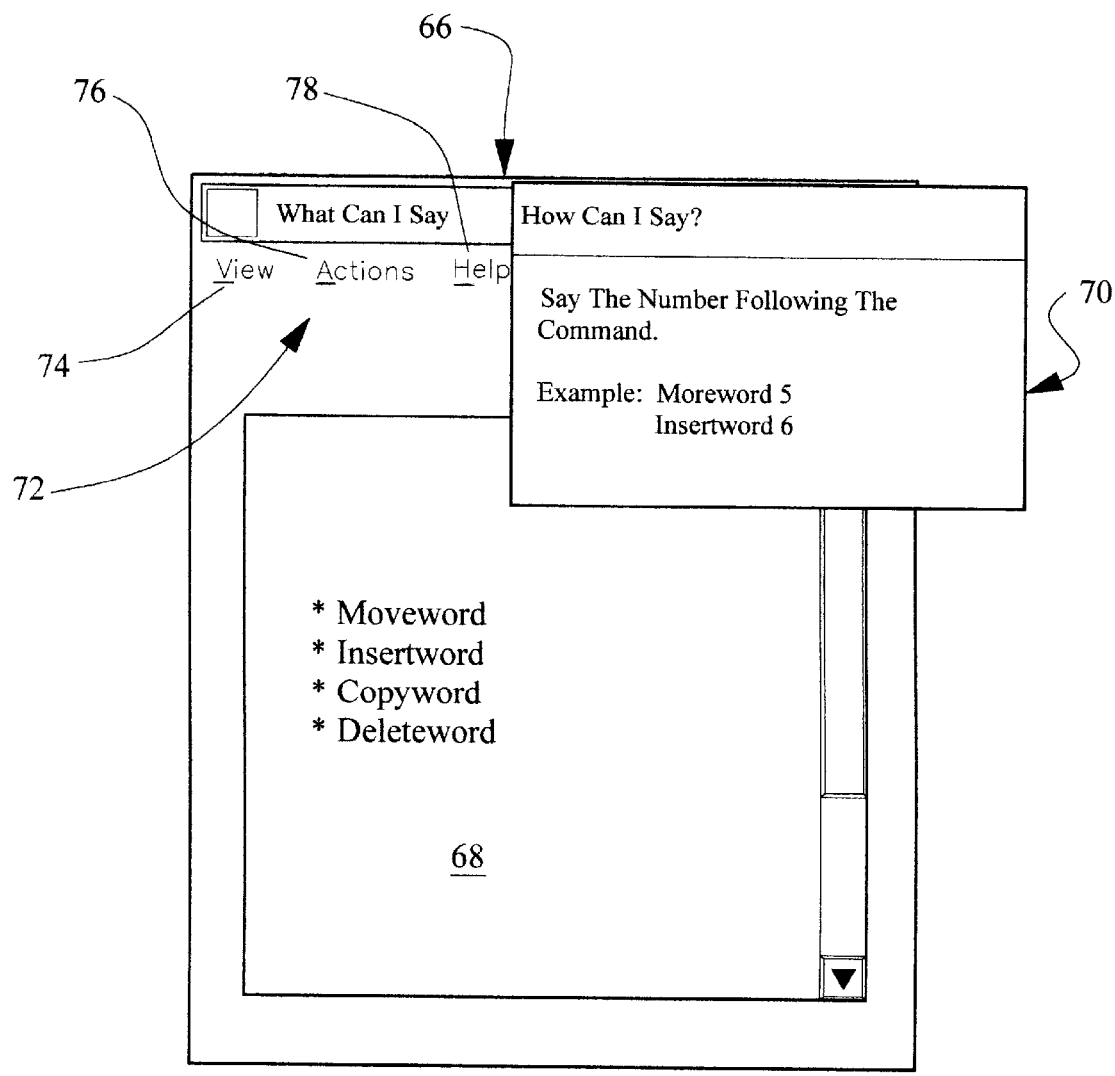
FIG. 5 is an exemplary What-Can-l-Say? window generated according to the present invention.

If the speech recognition system receives the WCIS command in step 54, it proceeds to step 56, and eventually displays a graphical user interface WCIS dialog window 66, an example of which is shown in FIG. 5. Otherwise, the WCIS window is not opened and the process returns to step 50 to receive the next user input.

Referring again to FIG. 4, at step 56, the logged event data is acquired, along with the current system state, and processed at step 60 to predict the event that the user is most likely to perform next. At this step, the present invention may be operated to predict any number of probable next events. If sufficient system resources exist, for example, the next five probable events, and their corresponding commands, may be determined. Weights may be assigned to each predicted event based upon the relative probability of it occurring next, which can then be used to set the number or order of the commands displayed in the WCIS window 66.

To enhance the accuracy of the prediction process, a statistical model, as known in the art, is preferably employed to determine the user's probable next event(s). The statistical model includes standardized norms for what events are performed at given states and following certain events. At step 58, the logged event data is used to update the statistical model. This adapts the speech recognition system to a specific user's command choice pattern. Thus, the system will better predict next events, the longer it is operated by a single user. The updating step in this embodiment occurs on an on-going basis while the spoken commands are recognized and executed. However, the present invention is not limited in this regard, as the model may be updated using the logged events at any time. For example, it may be updated at the user's request or automatically at a set interval, such as the termination of the speech recognition engine application.

At step 62, an algorithm, as is known in the art, is executed to determine the corresponding command for the probable next event predicted in step 60. For systems with sufficient memory and display capabilities, any alternate commands available to perform the same function can also be retrieved at this time. It will be appreciated by those skilled in the art that the precise mechanism for identifying the alternate phrases can vary from system to system. This can be any suitable procedure that is capable of taking a given phrase, determining its functional expression or result and searching the set of all functional expressions permitted in the grammar to identify the alternate speech phrases that could produce that functional expression. One approach involves the use of translation or rewrite rules, as are known in the art. For systems that do not support translation rules, different methods of producing the function expressed in the natural commands phrase would be required. For example, a parsing program can be used for this purpose.

At step 64, the commands are displayed in the WCIS dialog window 66. However, the present invention is not so limited as the probable commands can be conveyed to the user in any way, including audibly. The list of commands will be relatively short, preferably in the range of 1–5 commands, containing only the commands, and possibly their alternates, to execute the most likely next events. The commands will be displayed in order according to the most likely next event to be performed. The list will not include the entire panoply of commands associated with the active application, which may total in the millions. After the WCIS window is displayed, the process allows for another user input, typically the spoken command, which is monitored and logged. Preferably, the WCIS dialog window 66 remains open or active until either the speech recognition or speech-enabled application is terminated. However, the present invention is not limited in this regard, as the WCIS dialog window 66 may be closed after the command is executed and reopened at a later time.

Referring to FIG. 5, the WCIS dialog window 66 can be arranged so that the commands are displayed in a list format in area 68 of window 66. FIG. 5 shows an exemplary list of predicted commands for a user currently in a word processing application who has electronically selected, or highlighted, a word and wants to move it to another position in the document. In this example, based on the statistical analysis of the logged events at the current state, the commands "move word", "insert word", "copy word" and "delete word" are listed. The list of four commands generated by the present invention is very short, easy to read and utilizes little memory and processing power. Such lists may easily be generated by conventional embedded systems having minimal display capabilities.

In desktop or other systems where display, memory and processing power permit, the WCIS window 66 can be provided with another window or balloon 70 disposed, for example, over the upper right hand corner of the window 66. This balloon 70 can be used if, while the WCIS window is active, the user needed further clarification regarding how to speak text associated with a command. The balloon 70 can be initiated by the user's voice or by moving the mouse 20 pointer over one of the commands. As an example, if the user was unsure of how to move the selected word two words to the right, he or she may ask, "How do I say, move the word two to the right?" In the balloon 70, the system would display an explanation showing how to say the command associated text and preferably provide examples. The balloon 70 would then disappear with an input from the user, such as mouse 20 movement.

The WCIS window 66 can also be provided with pull down menus in the upper area 72 of the window 66. The menus can include, for example, a View menu 74, an Action menu 76 and a Help menu 78, each accessed by voice command or other input devices 18, 20. These menus can be used, as known in the art, to provide alternate views of the window, execute other actions, and receive helpful instructions, respectively.

The foregoing process is particularly useful in a speech recognition system in which the large number of possible command phrases causes searching through a conventional list of all possible commands to be impractical and inconvenient. The process is also useful to improve the command recognition accuracy of the system 30. It can help a user determine if the failure of the speech system to recognize a particular phrase is due to the phrase not being in the active grammar or due to some other cause. If the spoken phrase is not in the grammar, or the individual user has difficulty pronouncing certain commands so that they are readily understood by the speech recognition engine, another listed command may be used instead.

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. In a computer system adapted for speech recognition, a method for efficiently identifying voice commands for controlling a speech-enabled application running on said system, comprising the steps of:

receiving input from a user;

monitoring said system to log system events and ascertain a current system state;

predicting a probable next event according to said current system state and said logged events; and identifying acceptable voice commands to perform said next event.

2. The method according to claim 1, further comprising the step of notifying said user of said acceptable voice commands.

3. The method according to claim 2, wherein a dialog window is displayed to notify said user of said acceptable voice commands.

4. The method according to claim 1, wherein said system events include at least one of commands, system control activities, timed activities, and application activation.

5. The method according to claim 1, wherein said probable next event is predicted using a statistical model to analyze said events.

6. The method according to claim 5, wherein past events are used to modify said statistical model.

7. A computer speech recognition system for efficiently identifying voice commands for controlling a speech-enabled application, comprising:

interface means for receiving input from a user;

monitoring means for monitoring said system to log system events and ascertain a current system state;

processor means for predicting a probable next event according to said current system state and said logged events; and identification means for identifying acceptable voice commands to perform said next event.

8. The system as recited in claim 7, further comprising a display means for notifying said user of said acceptable voice commands.

9. The system as recited in claim 8, wherein a dialog window is displayed to notify said user of said acceptable voice commands.

10. The system as recited in claim 7, wherein said system events include at least one of commands, system control activities, timed activities, and application activation.

11. The system as recited in claim 7, wherein said probable next event is predicted using a statistical model to analyze said events.

12. The system as recited in claim 11, wherein past events are used to modify said statistical model.

13. A machine readable storage, having stored thereon a computer program having a plurality of code sections executable by a machine for causing the machine to perform the steps of:

receiving input from a user;

monitoring said machine to log system events and ascertain a current system state;

predicting a probable next event according to said current system state and said logged events; and identifying acceptable voice commands to perform said next event.

* * * * *